United States Patent [19]

Schieg et al.

[11] Patent Number: 5,017,198

[45] Date of Patent: May 21, 1991

[54] PROCESS FOR THE TREATMENT OF MATERIAL-GAS MIXTURES

[75] Inventors: Rudolf Schieg; Johann Tesch, both of Graz, Austria

[73] Assignee: Maschinenfabrik Andritz Actiengesellschaft, Graz, Austria

[21] Appl. No.: 471,487

[22] Filed: Jan. 29, 1990

[30] Foreign Application Priority Data

Jan. 31, 1989 [AT] Austria .................................. 190/89
Jan. 31, 1989 [AT] Austria .................................. 191/89
Jan. 15, 1990 [AT] Austria .................................. 72/90

[51] Int. Cl.$^5$ ............................................ B01D 19/00
[52] U.S. Cl. ........................................ 55/21; 55/52; 55/199; 55/203
[58] Field of Search ............. 55/21, 52, 55, 163, 55/189, 190, 192, 199, 201, 203

[56] References Cited

U.S. PATENT DOCUMENTS

| | | | |
|---|---|---|---|
| 2,849,930 | 9/1958 | Freeman et al. | 55/52 |
| 4,201,555 | 5/1980 | Trach | 55/21 X |
| 4,326,863 | 4/1982 | Day et al. | 55/171 |
| 4,362,536 | 12/1982 | Gullichsen | 55/52 |
| 4,410,337 | 10/1983 | Gullichsen et al. | 55/21 |
| 4,435,193 | 3/1984 | Gullichsen et al. | 55/21 |
| 4,640,771 | 2/1987 | Whalen et al. | 210/167 |
| 4,645,600 | 2/1987 | Filippi | 210/416.4 |
| 4,776,758 | 10/1988 | Gullichsen | 55/203 X |
| 4,832,709 | 5/1989 | Nagyszalanczy | 55/52 X |

FOREIGN PATENT DOCUMENTS

| | | |
|---|---|---|
| 384173 | 10/1987 | Austria . |
| 044466 | 1/1982 | European Pat. Off. . |
| 3111225 | 1/1982 | Fed. Rep. of Germany . |
| 668666 | 3/1952 | United Kingdom . |

Primary Examiner—Charles Hart
Attorney, Agent, or Firm—Beveridge, DeGrandi & Weilacher

[57] ABSTRACT

The invention relates to processes for the treatment of in particular medium and highly consistent material-gas mixtures to be pumped, preferably gas-containing, in particular air-containing fibrous material suspensions, a separation of the gas being effected prior to the pumping operation. The invention is mainly characterized in that the material-gas mixture, preferably the gas-containing fibrous material suspension, is subjected in a separate container separate from the pump housing for the separate gas separation, in particular air separation, preceding the pumping operation, to a conveniently high-speed rotation of in particular between 1,200 and 3,400 rpm, preferably of about 3,000 rpm, while at least in operation, gas, in particular air, is sucked off or a vacuum is generated approximately in the center of the rotating motion of the material-gas mixture. The invention further relates to plants and devices e.g. suitable for carrying out these processes. Conveniently, separate housings are provided for the degassing device and the pump.

106 Claims, 8 Drawing Sheets

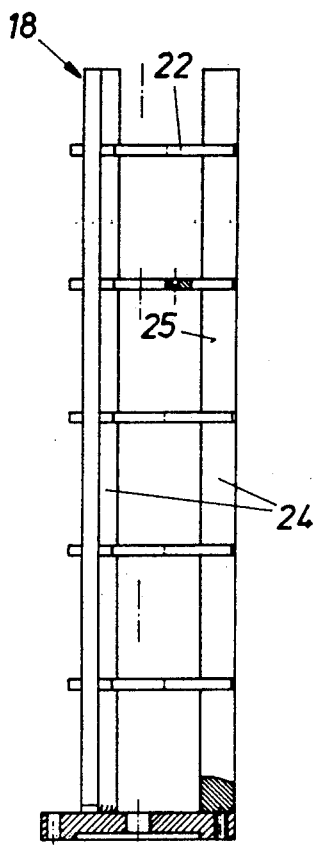
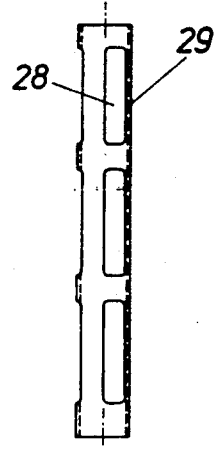
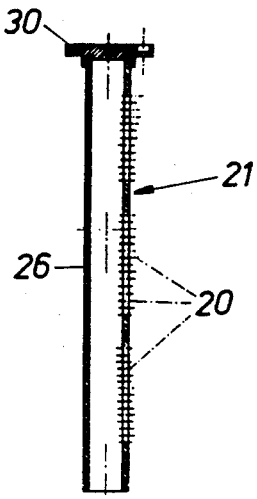
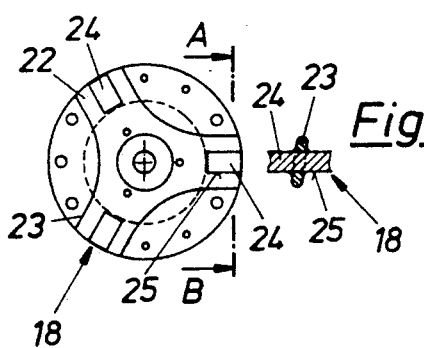
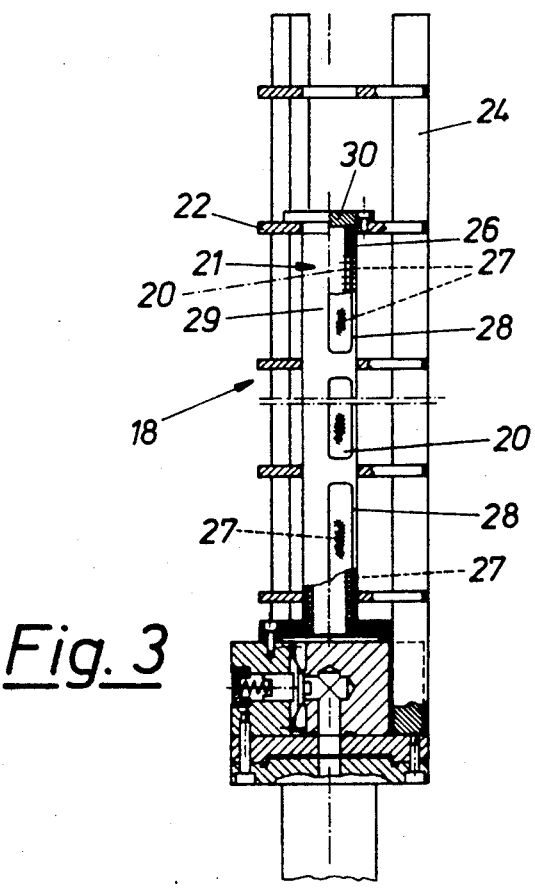

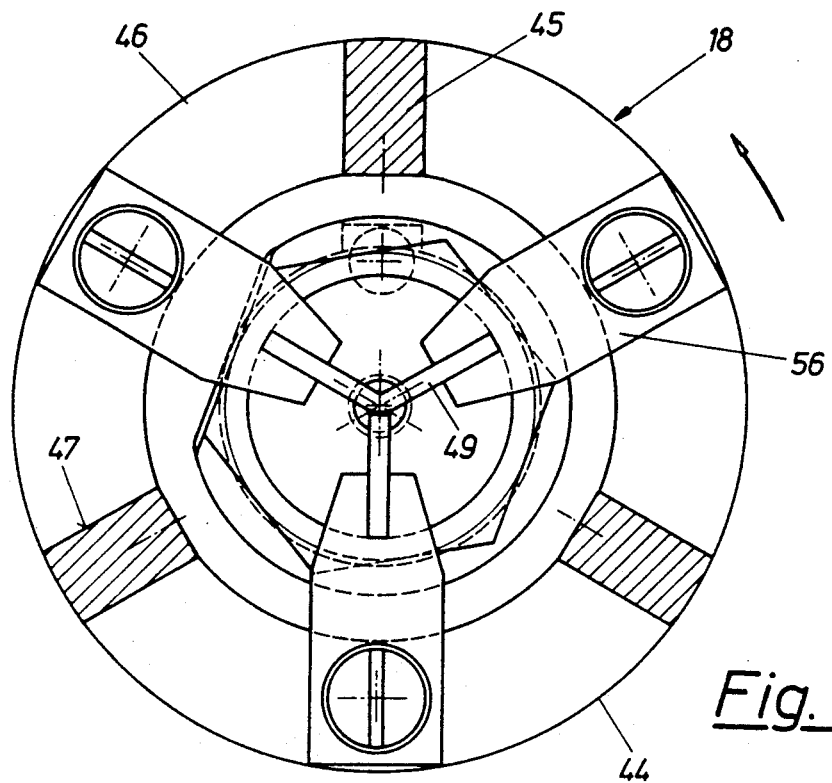
*Fig. 19*
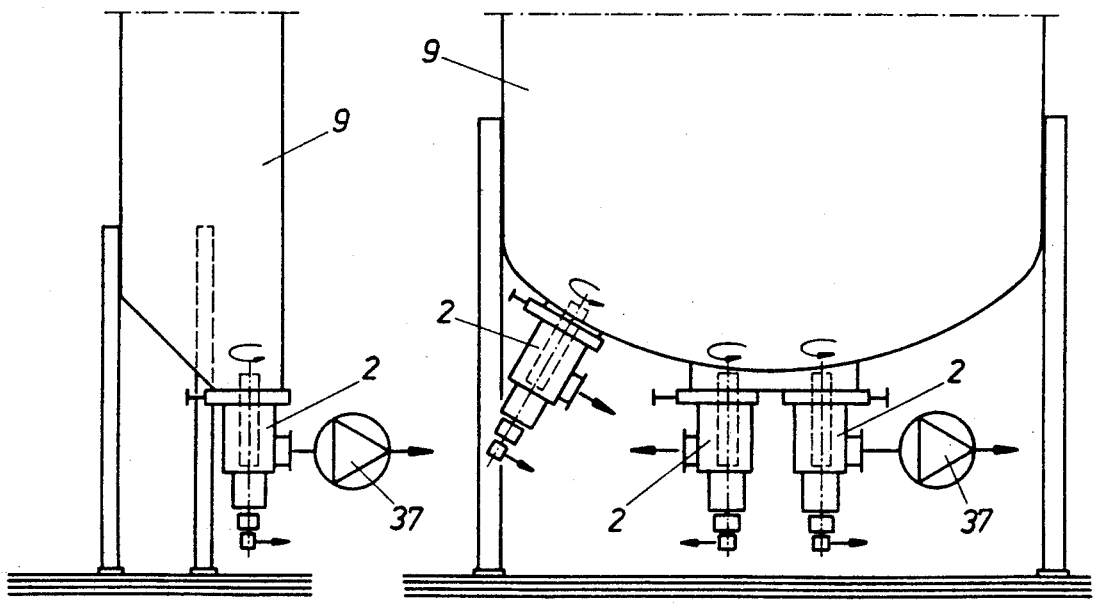
*Fig. 13*  *Fig. 14*

PROCESS FOR THE TREATMENT OF MATERIAL-GAS MIXTURES

The invention relates to processes for the treatment of in particular medium and highly consistent material-gas mixtures to be pumped, preferably gas-containing, in particular air-containing fibrous material suspensions, the gas being separated prior to the pumping operation. The invention also relates to plants for carrying out such processes and to apparatus particularly suitable for carrying out such processes. The invention thus also relates to the provision of apparatus for the separation of gases, in particular air, from in particular highly consistent material-gas mixtures, in particular fibrous material suspensions consisting of a conveniently approximately cylindrically formed housing and a rotor supported therein, the rotor axis being disposed e.g. approximately vertically in operation and the material-gas mixture feed into the housing or to the rotor provided e.g. on top and the material discharge provided on the housing periphery, with an axially extending gas-tapping, in particular air-tapping pipe provided with orifices disposed approximately in the center of the rotor and for instance entrained in rotation by the rotor, with a gas-tapping, in particular air-tapping channel joined to the bottom of its axially extending interior space and conveniently connected or connectable to a vacuum pump, the rotor length or height conveniently exceeding the outer diameter of the rotor, so that on connecting the apparatus to the underside of a container containing the material-gas mixture, in particular the fibrous material suspension, to be discharged, said rotor partly projects into said container.

It is known that the conveying of fibrous material suspensions within a consistency range up to about 8 percent atro (referring to dry matter) can be effected by means of conventional pulp pumps, while medium consistency pumps are used for the range of about 14 percent atro. Medium consistency pumps are provided with an integrated water-air control system. The pumps available at present are failure-prone, have a limited conveying volume and inadequate effect.

There are various reasons for difficulties arising: pulp fibers form a comparatively stable reticulation even in suspensions of low consistency. This net of fibers can be broken up when the fibrous material suspension is subjected to a turbulent state. At an appropriate turbulence, the fluidic behavior of the fibrous material suspension is similar to that of water. This also applies to suspensions of medium consistency. For this reason, centrifugal (rotary) pumps with open impeller acting as a turbulence generator have been designed. This pump is not satisfactory, however, because the fibrous material suspensions often contain large amounts of air, which is particularly interfering at high pulp consistency: this air collects in rotary pumps as an air bubble in the region of the hub. The bubble grows until it interrupts the pump delivery.

In order to improve the effectiveness of the pump, it has been proposed to provide a degassing system within the pump. The air passes through openings in the rotor into an air chamber located within the pump housing and itself connected to a vacuum system. This removes the air from the suspension to a certain extent. The air content can be reduced from 15 to 20 percent by volume to about 1 or 2 percent by volume.

These specially equipped pumps have the drawback, however, that in the event of damage to the degassing system or the pump components proper, the entire device has to be dismantled and replaced.

A known apparatus for degasssing pulp suspensions comprises a longitudinally extending, horizontal, cylindrical container, a distributor pipe parallel to this container from which a plurality of successive jet pipes for feeding the pulp suspension into the container emanates in the vicinity of the end of the container, a discharge pipe disposed close to the opposing end of the container and receiving the flow of the pulp suspension directed to the bottom of the container, members for keeping the level of the pulp suspension in the container constant, an additional discharge pipe for recycling the excessive pulp suspension fed into the container to the circulation and members for generating a negative pressure in the container. In order to prevent concentration fluctuations, the distributor pipe and the flow within it are directed counter to the flow in the interior of the container and the cross section of the flow decreases in diameter in the container towards the end at which the jet pipes are located, the decreasing flow cross section extending at least over the area of one jet pipe. The output of these devices is not always satisfactory. They are hardly suitable for highly consistent fibrous material suspensions.

As a result, a gas-separating device was proposed consisting of a rotor chamber in which a first impeller provided with blades is located, a gas space in which a second impeller provided with blades is located, as well as a wall between rotor chamber and gas space forming an annular gas discharge channel enclosing the shaft rotating the impellers, blades entrained by the shaft being arranged between the first and the second impeller in the gas discharge channel and said blades and the blades of the two impellers forming a surface extending from the first to the second impeller. The main drawbacks of this construction are the complicated design and the inadequate space for gas to be discharged and the limited interception of the gas.

Also known are centrifugal pumps with built-in gas separation. Aside from the fact that two or three rotors are used in these and their construction is complicated, they involve the hazard that no adequate separation of gases and suspensions is achieved. Moreover, the entire device must be replaced in case of damage.

DE-OS 31 11 225 als describes an apparatus for separating a gas from a fibrous suspension of high consistency comprising a housing with a rotor chamber having an inlet and an outlet for the fibrous material suspension and a gas outlet. The rotor chamber houses a rotor which is open in the middle or the center and attached to a solid or compact shaft and provided with blades. The rotor is provided on the bottom with a plate extending transversely to the rotor axis and having individual orifices. A further chamber communicating with the aforesaid orifices and having a lateral gas outlet is located underneath the rotor chamber. A further rotor also provided with blades is disposed underneath the aforesaid rotor, in particular in the aforesaid further chamber. The first-mentioned rotor can be provided with a tubular inner part with the blades attached to it and with orifices. Said tubular rotor part is provided with said plate on the bottom and connected to the solid shaft also carrying the blades mentioned in the second place. The two rotor elements provided with blades constitute not only considerable production cost, but also considerable construction height. In addition, the discharge of gas is strongly impeded due to the lateral gas discharge from the said further chamber and due to the plate disposed transversely to the rotor axis and having only a few orifices. The embodiment as impeller rotors and the small distance between the blade tips of the main rotor and the wall of the housing enclosing this rotor are the reason for the satisfactory separation and thus the degassing.

It is the main object of the invention to provide a pump system, in particular a centrifugal or rotary pump system, and a process for pumping in particular medium and highly consistent material-gas mixtures, perferably gas-containing, in particular air-containing fibrous material suspensions and a plant intended therefor, in which the aforementioned drawbacks are eliminated. A consistency range of from 0 to about 15 percent atro is to be handled without problems. Moreover, an adjustment to various types and consistencies of pulp, a functioning after extended idle time and control possibilities for stable delivery are to be achieved.

In order to achieve these objects, the invention is based on a process for pumping in particular medium and highly consistent material-gas mixtures, preferably gas-containing, in particular air-containing fibrous material suspensions, in which the separation of the gas is effected prior to the pumping operation. The process according to the invention is mainly characterized in that the material-gas mixture, preferably the gas-containing fibrous material suspension, is subjected in a separate container separate from the pump housing for the separate gas separation, in particular air separation preceding the pumping operation, to a conveniently high-speed rotation of in particular between 1,200 and 3,400 rpm, preferably of about 3,000 rpm, while gas, in particular air, is sucked from the material-gas mixture or a vacuum is generated at least during operation approximately in the center of the rotating motion. A centrifugal governor or a valve opens the connection to the vacuum pump for this purpose. A plant according to the invention for carrying out the process according to the invention is thus designed in such a manner that a pump, in particular a centrifugal or rotary pump, is provided with a housing separate from the housing of the degassing device, with separate driving engines conveniently being allocated to the pump and the degassing device. In the event of failure, it is thus sufficient to replace either the pump proper or the degassing device. This also increases the operational safety of the pump itself.

Known per se is a plant in which a hydrocyclone for removing contaminants and a closed degassing container are provided between two pumps for delivering paper pulp, degassing in the latter container being effected simply as a result of negative pressure. There is no rotational movement of the pulp in the degassing container, so that the favorable results according to the invention cannot be achieved.

The process according to the invention may be further developed by providing for the material-gas mixture to be fed to the separate container from the top or laterally, the gas discharge to be effected in the center, for instance on the underside or on the side of the vacuum pump connection or on the side of the spearate container of the rotor facing away from the mixture feed and the discharge of the virtually degassed mixture to the pump separate from this container being effected on the outer jacket of said container. The natural material flow is particularly enhanced if the material-gas mixture is fed from an in particular perpendicular storage container, in particular gravity tower or an integrated pipe system, directly to the rotating mixture. A particularly economical operation can be achieved by providing for the number of revolutions of the rotating speed of the mixture and the allocated driving engine and of the pump and of a pump generating the vacuum, to be tuned, in particular by the pre-programmed automatic control of a computer program, as a function of the consistency of the mixture fed, its predetermined delivery volume and delivery height in such a manner that the pump delivers optimally over its entire operating and control range, while the separation of gas, in particular air, is effected by means of a virtual minimum of energy and power. The degassing device and the stuffing box of the vacuum pump are conveniently flushed with water prior to starting the degassing and pumping operation.

A good functioning is assured when the evacuation or aspiration of the gas, in particular the air, from the separate container, in particular the center of the rotating motion of the material-gas mixture or a degassing device serving this purpose, is controlled as a function of the power input of the engine generating the rotation of the material-gas mixture in the separate container. The set value for power input is conveniently lower by 10 to 75 percent, in particular by 20 to 40 percent, advantageously by about 30 percent, than that of the operation with a suspension free of gas or air or water.

The plant according to the invention generally characterized above permits particularly favorable results when a vacuum pump is connected to the degassing device. This pump can be provided on the underside of the separate container or on the side facing away from the mixture feed, preferably on the bottom of the separate container of a degassing device of approximately perpendicular axis of rotation of the mixture to be degassed, the gas being discharged in a vertical direction. Gas discharges between the vertical and the horizontal are also possible, with the vacuum pump and its inlet line being connected obliquely on the bottom of the separate container or obliquely or horizontally on its side wall. According to a further development of the invention, the storage container for the material-gas mixture, in particular the gas-containing fibrous material suspension, for instance an approximately perpendicular gravity tower, can be immediately connected to the housing of the degassing device, for instance on its top side, but also in other locations of said housing; this permits a particularly convenient material flow depending on the practical conditions.

For the initial flushing of the sytem mentioned above, the degassing device and the vacuum pump are conveniently connected to a flushing water source via appropriate conduits or valves. To assure a trouble-free operation of the plant, the degassing device and the vacuum pump are preferably connected to a cooling medium source, in particular a cooling water source.

A virtually maintenance-free operation can be achieved according to the invention if an electric control device, in particular an automatic control device preprogrammed by means of a computer program, is connected to the pump engine or its speedometer or its speed control, to the engine of the degassing device, to the vacuum pump, to the flushing valve, to the vacuum irrigation valve, the vacuum adjusting valve, the filling level meter of the storage container, the valve for feeding the mixture into the storage container and the pump delivery meter.

The degassing operation is particularly effective if the degassing device, in addition to the separate housing, consists of a rotor suported therein and mainly serving as a high-speed agitating element, the axis of said rotor, depending on the assembling requirements, extending e.g. from approximately vertically to approximately horizontally in operation and the material-gas mixture feed into the separate housing or to the rotor conveniently being provided from top to laterally and the material discharge preferably provided on the housing periphery, one single cage-like rotor being supported in a conveniently approximately cylindrically formed housing and a gas-tapping, in particular air-tapping pipe provided with orifices axially extending approxiamtely in the rotor center and conveniently entrained by the rotor, a gas-tapping, in particular air-tapping channel conveniently connected or connectable to the vacuum pump joined or connected to said pipe on its axially extending interior space on the bottom or on the end facing away from the mixture feed and approximately coinciding, in particular aligned, with the rotor axis, the length or height of the rotor conveniently in particular substantially exceeding the outer diameter of the rotor, so that on connecting the device to a container containing the material-gas mixture, in particular the fibrous material suspension, to be discharged, said rotor partially projects into said container. This effect may be further increased if the rotor consists of cross-axially extending, circular disks of in particular star-like shape on their periphery and ledges extending parallel to the axis attached, preferably sunkenly, on the periphery of the disk, in particular the arms or points of the stars and stars with three points and upended ledges with approxoximately radially directed lateral longitudinal faces attached thereon are provided.

The devices described above are generally suitable for the separation of gas, in particular air, from in particular medium to highly consistent material-gas mixtures, in particular fibrous material suspensions. They generally consist of a conveniently approximately cylindrically formed housing and a rotor supported therein, the rotor axis in operation extending e.g. approximately vertically and the material-gas mixture feed into the housing or to the rotor provided e.g. on the top and the material discharge provided on the housing periphery, a gas-tapping pipe, in particular air-tapping pipe provided with orifices axially extending approximately in the rotor center and e.g. entrained by the rotor, a gas-tapping channel, in particular air-tapping channel conveniently connected or connectable to a vacuum pump, joined to its axially extending interior space on the bottom or on its end facing away from the material feed, the rotor length or height conveniently exceeding the outer diameter of the rotor, so that on connecting the device to the underside of a container containing the material-gas mixture, in particular the fibrous material suspension, to be discharged, said rotor partially projects into said container. According to a further development of the invention, said device is characterized in that, in particular for the separate degassing of the material-gas mixture, in particular the fibrous material suspension, prior to its charging into a pump, a single rotor of cage-like form mainly serving as a high-speed agitating element is supported in a housing of a diameter substantially greater than the outer diameter of the rotor and that the gas-tapping channel is immediately joined or connected to the interior space of the gas-tapping pipe and approximately coinciding, in particular aligned, with the rotor axis. The cage-like rotor is conveniently provided with a single cage of cross-axially extending, circular, in particular star-shaped disks and ledges extending parallel to the axis attached to the disk periphery, in particular to the arms or points of the stars, preferably sunkenly.

This device is conveniently characterized by three-armed stars with upended ledges attached thereon of approximately radially oriented lateral longitudinal faces whose width measured in radial direction is substantially smaller than the length of the outer radius of the rotor.

Material feed and degassing are particularly enhanced if star-like disks are formed propeller-like, in particular by twisting the star arms, conveniently within the zone of the feed of the material-gas mixture or in the rotor part projecting into the container to be emptied, and the rotor is eccentrically supported in the housing.

A practically particularly favorable embodiment of the degassing device is achieved according to the invention by providing for the gas-tapping pipe, in particular air-tapping pipe, to consist of a supporting pipe provided with orifices disposed inside, a perforated pipe surrounding the supporting pipe and a retaining pipe provided with orifices, in particular large orifices, in the area of the supporting pipe orifices, surrrounding the perforated pipe, and for the gas-tapping pipe, in particular air-tapping pipe, to be closed, conveniently on top, on the end remote from the connection to the vacuum pump. The rotor, in particular its lower end, is conveniently connected to a centrifugal governor, a centrifugal valve or a solenoid or the like, which makes the vacuum active from a predetermined rotor speed on.

The process according to the invention takes a particularly favorable course by means of features or variants of the plant previously desribed. The operation is conveniently started by first opening the flushing valve, then starting the pump engine in particular at about 2,500 rpm at locked control circuit, then starting the engine for the degassing device, then opening the valve for the cooling water supply, then switching on the vacuum pump and opening the vacuum irrigation valve, the vacuum adjusting valve remaining closed at locked control circuit and the vacuum control finally being released following the flushing operation.

The plant is conveniently operated by first closing the flushing valve, then actuating the vacuum adjusting valve for switching on the vacuum control or vacuum pump, and finally releasing the level control conveniently acting on the automatic contol on reaching a predetermined level of the material-gas mixture, in particular the fibrous material suspension, in the in particular vertical storage container, in particular gravity tower.

According to the invention, the degassing and pumping operation is conveniently switched off by first switching off the vacuum pump, then closing the vacuum irrigation valve and the vacuum adjusting valve, whereupon the flushing valve is opened and the pump engine is switched off and finally the flushing valve is opened, the degassing engine is switched off and the cooling water valve is closed.

According to the further development of the invention, a preprogrammed automatic control device connected to a current meter of the rotor engine and to and a vacuum control valve is provided, whereby the evacuation or aspiration of the gas, in particular of the air, from the gas-tapping pipe, in particular the air-tapping pipe, in particular the center of the rotating motion of the material-gas mixture, is controllable as a function of the power input of the rotor generating the rotation of the material-gas mixture in the housing containing the rotor. The control device is conveniently set at a set value for the power input of the rotor generating the rotation of the material-gas mixture which is lower by 10 to 75 percent, in particular by 20 to 40 percent, conveniently by about 30 percent, than that in operation with a suspension free of gas or air or water.

A further device according to the invention is characterized in that in particular for the separate preparation of a fibrous material suspension prior to its introduction into a pump, a single, cage-like rotor mainly serving as a high-speed agitating element is supported in a conveniently approximately cylindrically formed housing and that a gas-tapping pipe, in particular air-tapping pipe, extends axially in the rotor center, stationary in relation to the rotor and provided with an orifice on its upper end, a stationary gas-tapping channel, in particular air-tapping channel, conveniently connected or connectable to a vacuum pump, being joined to the lower end of said pipe facing away from the mixture feed, the length or height of the rotor conveniently substantially exceeding the outer diameter of the rotor, so that when connecting the device to a container containing the material-gas mixture, in particular the fibrous material suspension, to be discharged, said rotor partially projects into said container and the rotor axis, depending on the assembling, extends from vertically to horizontally in operation and the material-gas mixture feed into the housing or to the rotor is provided from top to laterally and the material discharge is provided on the housing periphery. The rotor may be provided with circular disks extending approximately cross-axially to its axis of rotation and can conveniently be provided with partially helically arranged circle sectors attached to ledges extending parallel to the axis, which particularly enhances degassing. It is of particular advantage to provide circle sectors with upended ledges with approximately radially extending lateral longitudinal faces attached thereon and a conveniently three-armed blade-star extending parallel to the axis in the center of the rotor approximately starting from the inner end of the gas-tapping pipe, in particular the air-tapping pipe, on, and forming part of the rotor, thus being entrained by the rotor cage in operation, the diameter of the blade-star being substantially smaller than the outer diameter of the rotor. This enhances the formation of a gas column in the center, particularly if the mixture forms a paraboloid during rotation. This is enhanced if the inner diameter of the rotor housing is substantially larger than the outer diameter of the rotor, for instance if the ratio is one of 3 to 1 to 1.5 to 1, conveniently of about 2.5 to 1 to the outer diameter of the rotor. The gas separation can be favorably influenced by supporting the rotor eccentrically in the in particular cylindrical housing. According to a further development of the invention, an in particular cylindrical space directly or indirectly connected to a cooling water supply or to the vacuum pump is provided between the outer jacket of the gas-tapping pipe and the shaft of the rotor which is hollow in the area of this pipe and its bearings and seals, so that the cooling water required for cooling the seal of the gas-tapping pipe, in particular air-tapping pipe, stationary in relation to the rotor shaft, conveniently also serves for cooling and lubricating the sliding bearing supporting the gas-tapping pipe, in particular air-tapping pipe, entrained in rotation by the shaft, and subsequently as flushing water for the air-tapping pipe, which water is supplied during operation and finally evacuated by the vacuum pump. The device is conveniently operated if the evacuation or aspiration of the gas, in particular the air, from the gas-tapping pipe, in particular the air-tapping pipe, in particular from the center of the rotating motion of the material-gas mixture, is controlled as a function of the power input of the engine generating the rotation of the material-gas mixture in the housing containing the rotor and the set value for power input is controlled to be lower by 10 to 75 percent, in particular by 20 to 40 percent, conveniently by about 30 percent, than that at operation with suspension free of gas or air or water.

The invention is explained by means of an exemplary embodiment with reference to the accompany drawing wherein FIG. 1 shows a diagrammatic reprsentation of the entire system;

FIG. 3 represents the allocated rotor partly in axial section and partly in elevational view and partly in axial section., FIG. 4 is an elevational view of the rotor with the degassing device omitted;

FIG. 5 shows a top view thereof;

FIG. 6 represents a sectional view A—B of the arm of a rotor star or a ledge portion;

FIG. 7 shows the supporting pipe and

Figure 9:
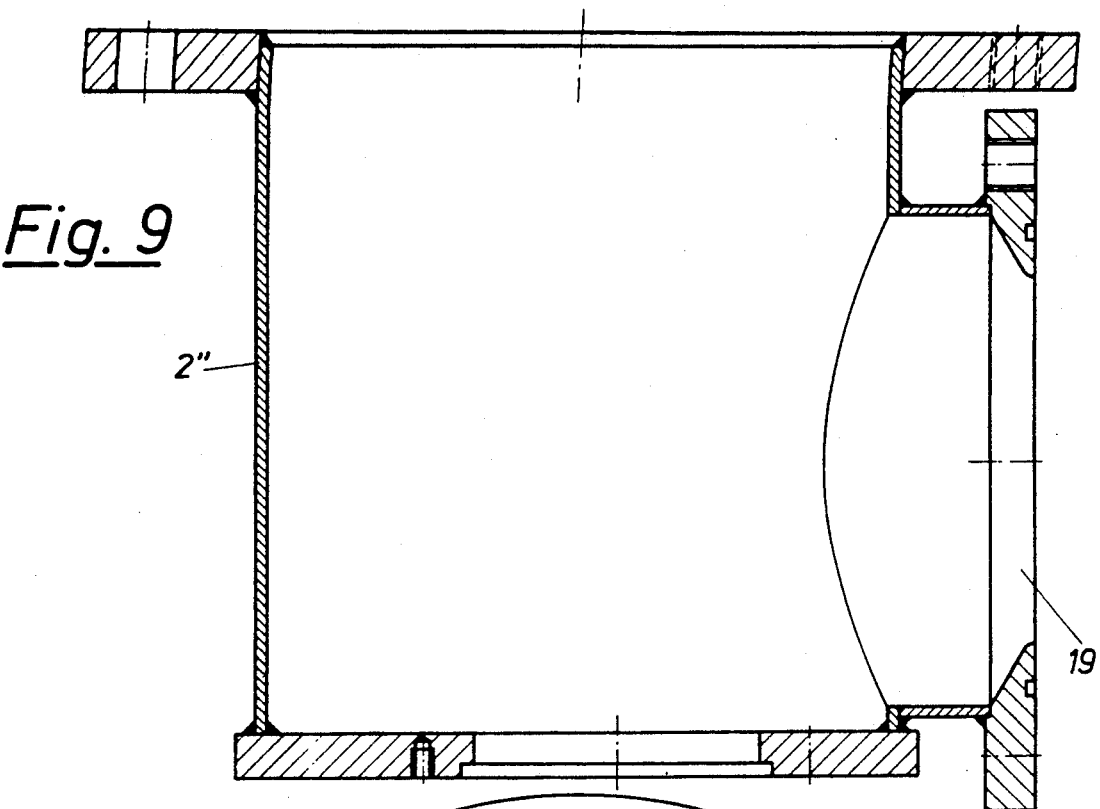
Figure 10:
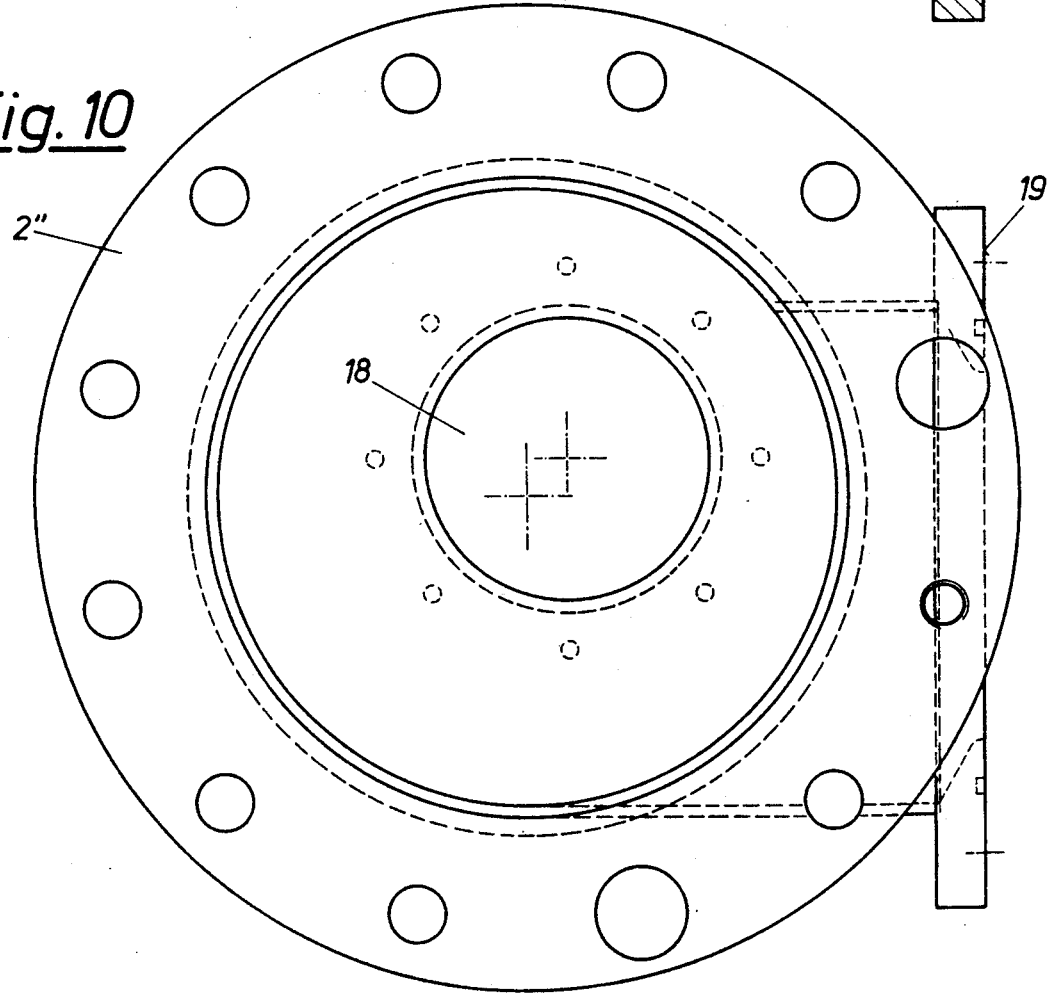
Figure 11:
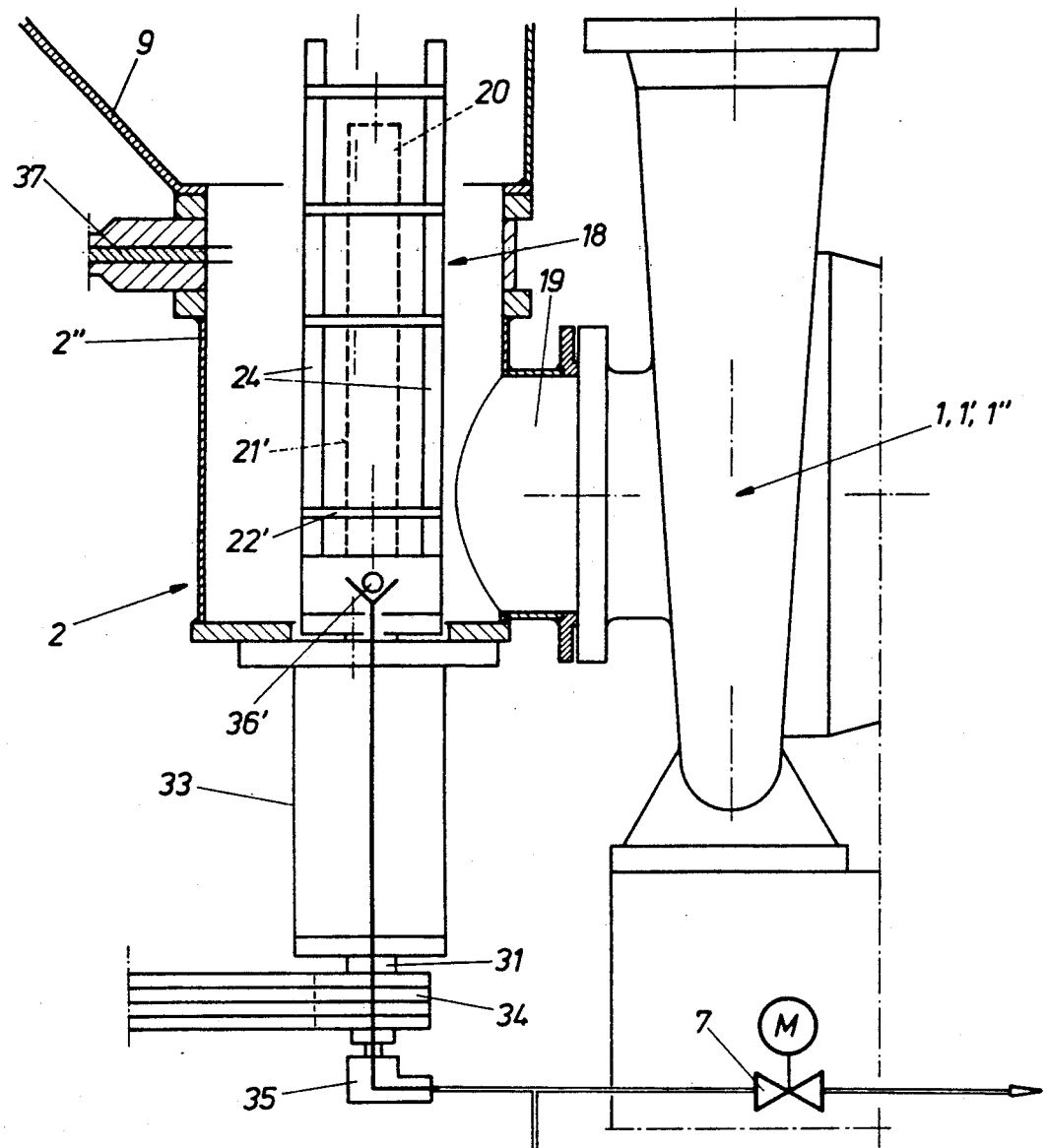
Figure 12:
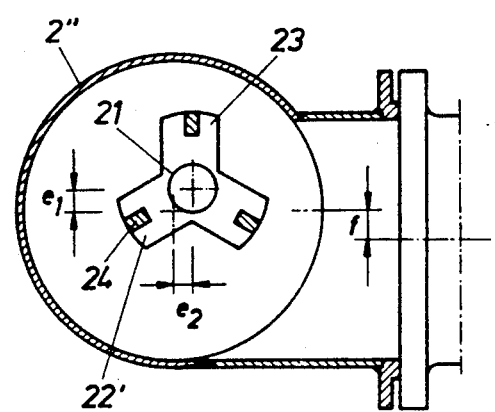
Figures 15, 16:
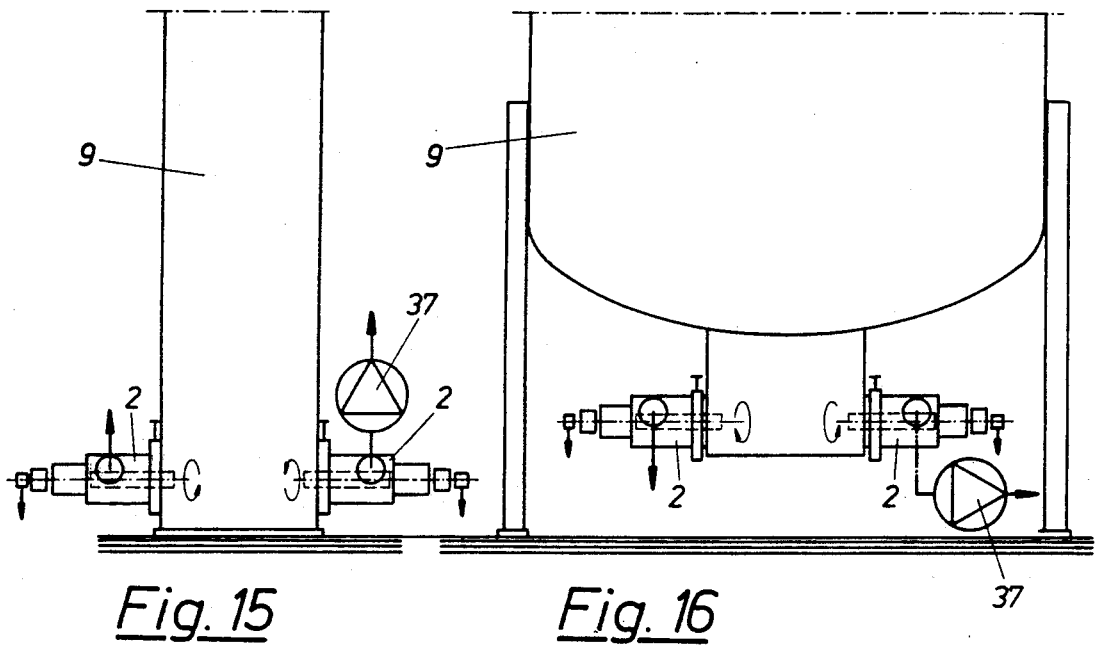
Figure 17:
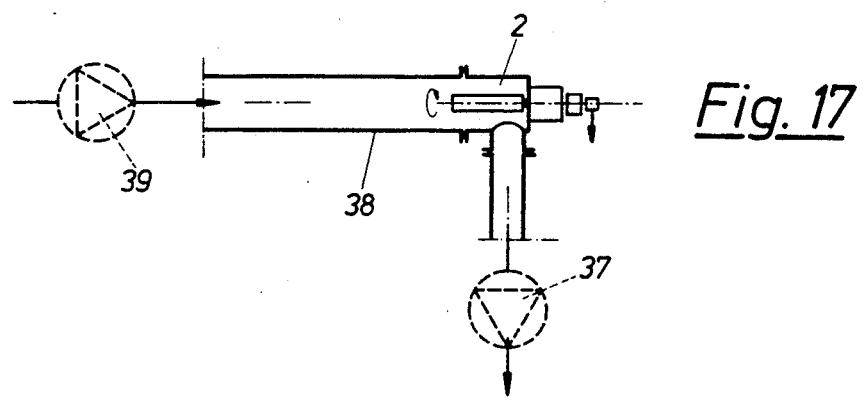
Figure 18:
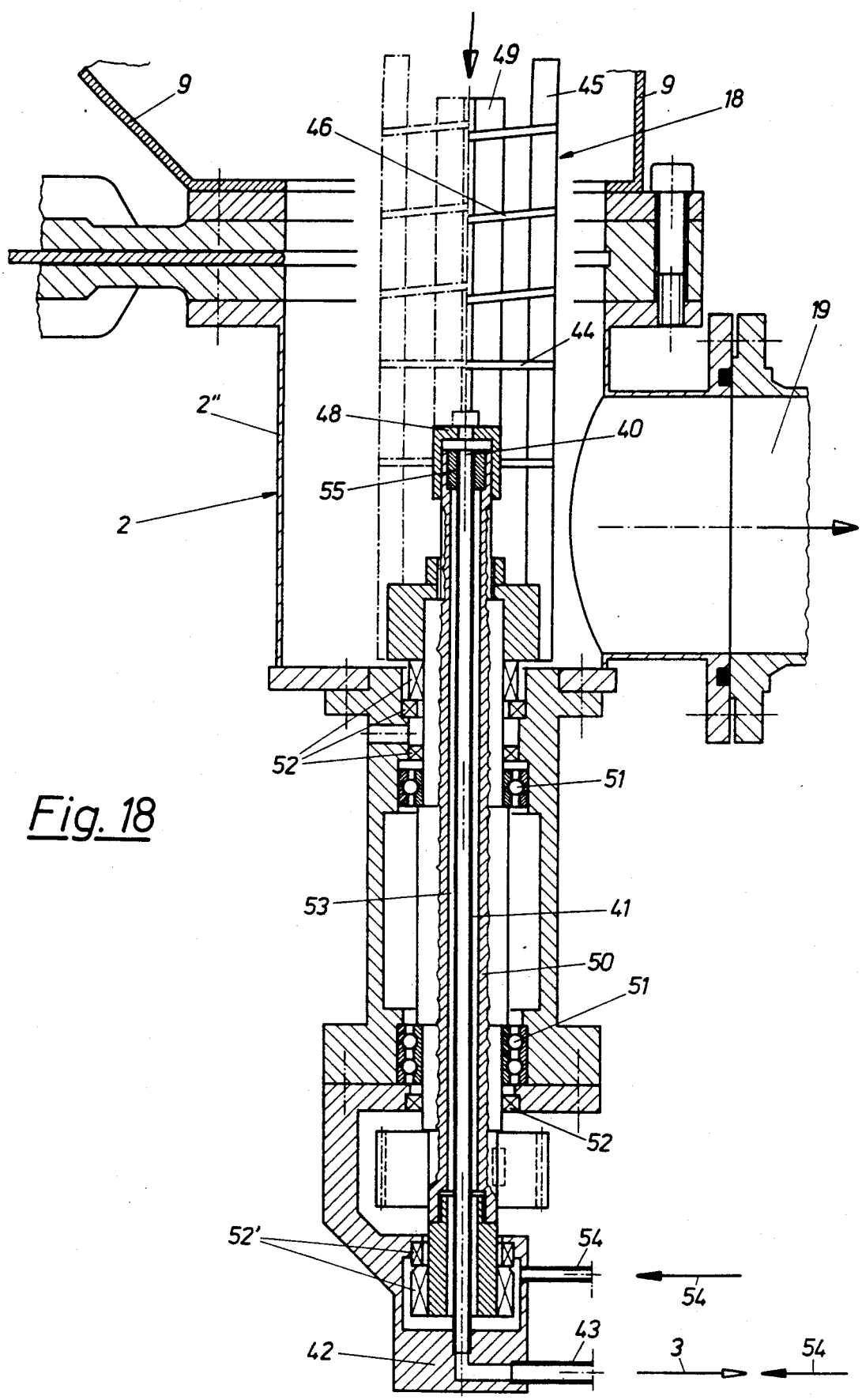

FIG. 8 the retaining pipe of the gas-tapping pipe;

FIGS. 9 and 10 represent a longitudinal view and a plan view of the housing and in the latter case also of the rotor of the degassing device;

FIG. 11 shows, partially in axial longitudinal section and partially in elevational view, and FIG. 12 in horizontal cross section, a variant of the degassing device;

FIGS. 13 to 16 diagrammatically represent various connections of the degassing device to storage and supply containers;

FIG. 17 shows an assembling variant with a degassing device installed in a pipeline and having a pump disposed upstream or downstream;

FIG. 18 is a longitudinal section of a further degassing device and

FIG. 19 shows a cross section through an allocated rotor along plane C—D in FIG. 13.

Figure 1:
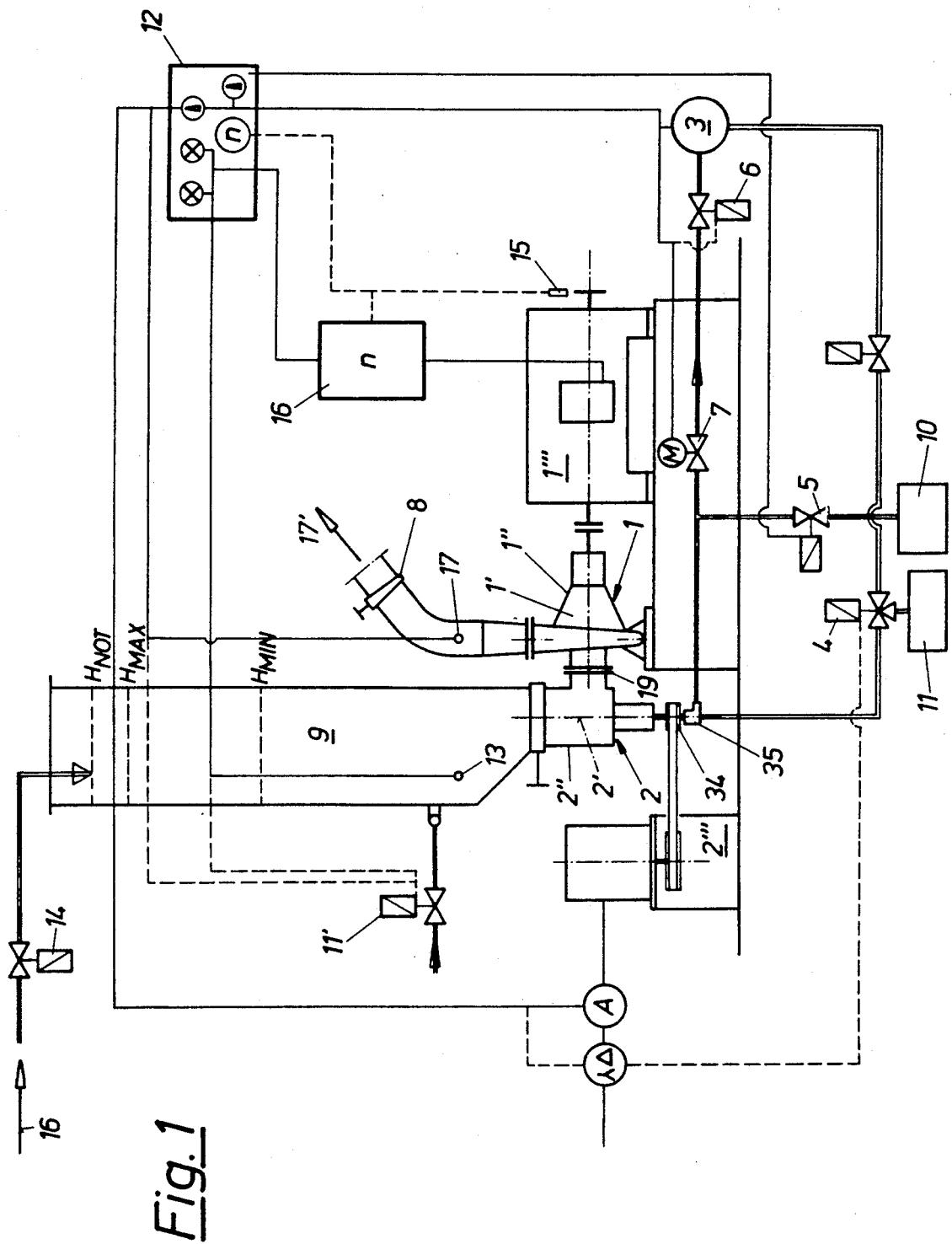

Arrow 16 in FIG. 1 shows that an air-containing fibrous material suspension from a preceding column is first introduced from the top into the approximately vertical storage container or the collecting main or the supply container or the stand pipe or the gravity tower 9 and is conveyed from the lower end thereof directly to the degassing means or the status control 2, 2', 2'' on the top side of its housing or stator 2''. The virtually degassed material is then advanced for further use by means of the separately disposed pump 1, 1', 1'' after opening the slide 8 on the delivery side, as shown by arrow 17'. Further provided is a flushing system explained in detail later on. It should be noted in detail that the pump 1', in particular a centrigufal or rotary pump, is provided with a housing 1'' separated from the housing 2" of the degassing device 2', separate driving engines 1'" and 2'" conveniently being allocated to the pump and the degassing means. A vacuum pump 3, in particular with constant output, is connected on the bottom of the container or housing 2" of the degassing device in which a rotating motion of approximately vertical axis of rotation is to be imparted to the mixture to be degassed.

The degassing device 2 and the vacuum pump 3 are connected via corresponding lines or valves 5 to 7 to a flushing water source 10. Moreover, the degassing device 2 and the vacuum pump 3 are connected to a cooling water source 11 (valve 4).

For the practical use of the plant, is it convenient to provide an electric control device, conveniently in the form of an electronic cabinet 12, in particular an automatic control device preprogrammed by means of a computer program which is connected to the pump engine 1'" or its speedometer 15 and its speed control 16, to the engine 2'" of the degassing device, to the vacuum pump 3, to the flushing valve 5 conveniently provided as a solenoid, to the vacuum irrigation valve 6 conveniently provided as a solenoid, to the conveniently electrically actuated vacuum adjusting valve 7, to the filling level meter 13 of the storage container 9, to the valve 14 for feeding the mixture into the storage container, and the meter 17 for the pumped volume.

The degassing device 2 is provided with a rotor 18 serving as a high-speed agitating element in a separate housing 2". In operation, said rotor is supported in said housing with vertical axis. As already mentioned, the air-containing suspension is introduced into the housing 2" or the rotor 18 from the top, the material virtually free of air is evacuated on the periphery of the housing 2" at 19.

It is evident from the drawing that only a single, cage-like rotor 18 is provided in the cylindrically formed housing 2". An air-tapping pipe 21 attached to the vacuum pump 3, provided with orifices and entrained in rotation by the rotor, is provided in the rotor center. In the instant case, the length or height of the rotor 18 substantially exceeds the outer diameter of the rotor, so that said rotor protrudes into the storage container or gravity tower 9 from underneath.

In this case, the rotor consists of cross-axially disposed disks 22 star-shaped on the periphery and ledges or ribs 24 extending parallel to the axis and sunkenly attached on the periphery on the star arms 23. In this case, FIG. 5 shows three-armed stars on which upended ledges having approximately radially directed lateral longitudinal faces 25 are attached. FIG. 6 shows that star-like disks 22, 23, formed propeller-like in this case by deformation or twisting of the star arms 23, are conveniently provided in the area of the feed of the material-air mixture or in the rotor part projecting into the storage container.

Figure 2:
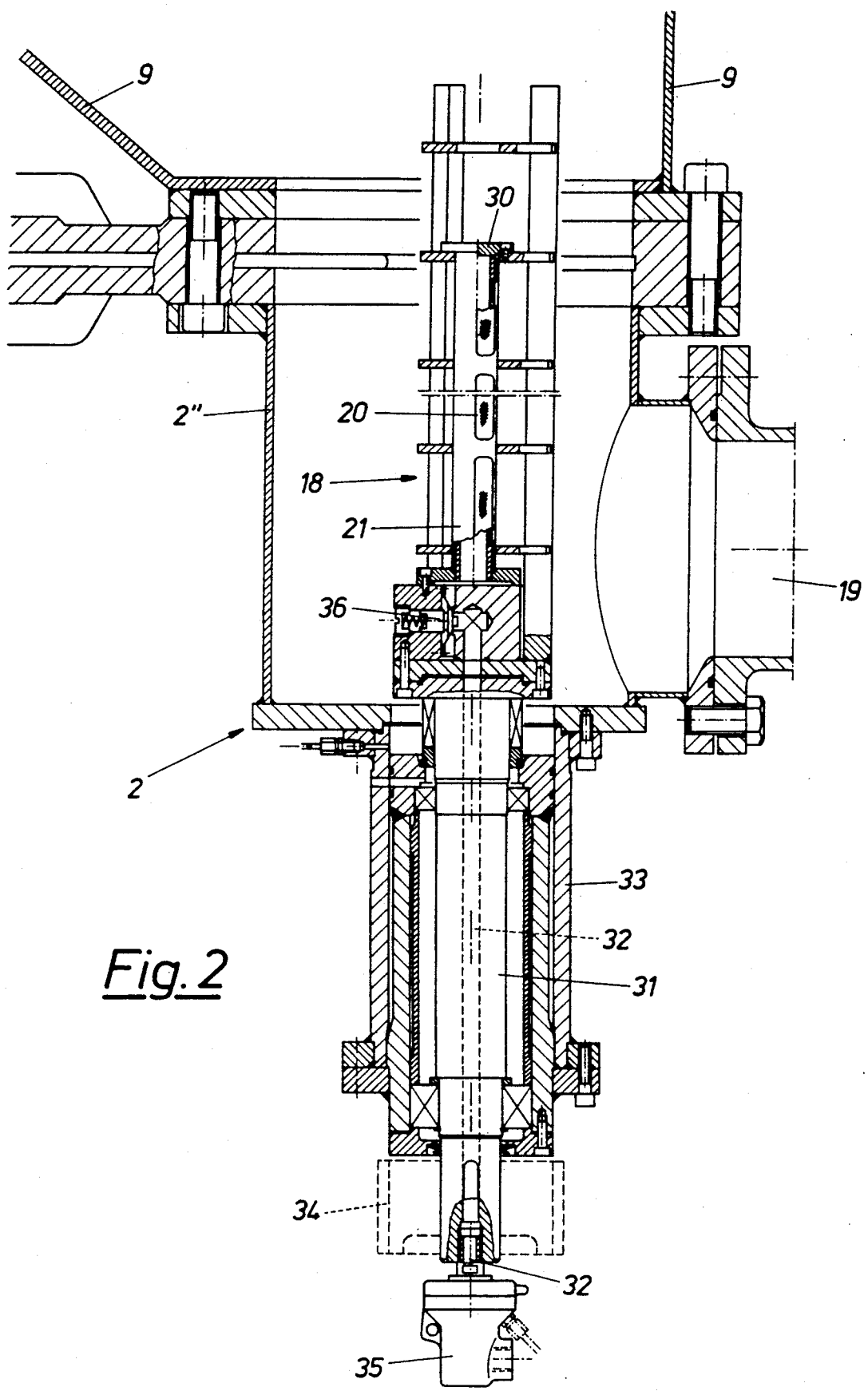
FIG. 2 shows a degassing device with the lower portion of the storage container in vertical section and axial section.

FIG. 2 and 10 show that the rotor 18 is eccentrically supported in the housing 2" in order to optimize the material flow through the degassing device.

In this case, the air-tapping pipe 21 consists of a supporting pipe 26 provided with orifices 20, of a perforated pipe 27 enclosing the supporting pipe and a retaining pipe 29 enclosing the perforated pipe and provided with large orifices 28 in the area of the supporting pipe orifices 20. The air-tapping pipe 21 is conveniently closed on its upper end by means of a covering disk 30.

The rotor 18 is connected on the bottom to the driving shaft 31 made to pass downwards like the connection 32 of the air-tapping pipe 21, 26 through a guide or bearing pipe 33. The driving shaft 31 is connected to a V-belt pulley 34 subjected to the action of the driving engine 2'". The connection 32 is connected to the vacuum pump 3 via a sealing head 35.

As already mentioned in the introduction, the plant described above permits the pumping of, in particular highly consistent, material-air mixtures, in particular air-containing fibrous material suspensions, in such a manner that the air is separated prior to the pumping operation. The material-air mixture, preferably the air-containing fibrous material suspension, is subjected in a container 2' separate from the pump housing for the separate air separation preceding the pumping operation to a conveniently high-speed rotation, in particular between 1,200 and 3,400 rpm, preferably of 3,000 rpm, while a vacuum is generated at least during operation approximately in the center of the rotating motion of the material-air mixture. A centrifugal governor 36 opens the connection to the vacuum pump as soon as the rotor 18 has reached a predetermined number of revolutions.

The material-air mixture is fed to the separate container 2 from the top, the air is evacuated on the underside of the separate container and the discharge of the mixture virtually free of air to the pump 1 disposed separately from this container 2 is effected on the outer jacket of said container at 19. The material-air mixture is fed from the vertical gravity tower 9 directly to the rotating mixture. The speed of the rotating motion of the mixture or of the allocated driving engine and the pump as well as that of the vacuum pump are tuned as a function of the consistency of the mixture fed, its predetermined delivery quantity and delivery height in particular by means of an automatic control preprogrammed by means of a computer program in such a manner that the pump 1, 1', 1" optimally delivers over its entire operating and control range, in particular at constant power and current consumption, while the separation of air is effected at virtually minimal power and current consumption.

The slightly modified variant of the degassing device 2 according to FIGS. 11 and 12 diagrammatically shows a centrifugal valve 36' and a shut-off slide 37 which can be closed subsequent to lowering the rotor 18 of the degassing device. A shut-off slide of this type can be convenient if there are large supply containers or gravity towers or collecting mains or stand pipes 9 or in cases where an evacuation of this container 9 is not possible in the event of a required repair of the degassing device.

A solenoid controllable from the outside can be provided instead of the centrifugal valve 36 or 36', the respective control commands can be input via slip rings or the like.

FIG. 12 shows that the form of the star-shaped disks 22' of the again cage-like rotor 18, serving as reinforcing blades, is slightly modified. The filter pipe 21' can be provided with passage orifices for the gas, in particular air, over its entire surface, in particular over its entire jacket.

The sealing head 35 constitutes the transition from the rotating shaft 31 to the stationary flushing or degassing line. The flushing valve can be actuated electromagnetically or pneumatically.

The remaining parts of the variant according to FIGS. 11 and 12 substantially correspond to the embodiment according to FIGS. 2 to 10 (or FIG. 1), identical reference symbols being used.

To start the degassing and pumping operation, the degassing device 2, 2', 2" and the stuffing box of the vacuum pump 3 are first flushed with water by opening the flushing valve 5 and starting the pump engine 1'". First, the flushing valve 5 is opened, then the pump engine 1'" is started after about 5 seconds in particular at about 1,500 to 2,500 rpm at slide 8 open on the delivery side and locked control circuit, after about 15 seconds, the engine 2'" for the degassing device is started, the valve 4 for cooling water supply conveniently formed as a solenoid is opened, the vacuum pump 3 is switched on and the vacuum irrigation valve 6 is opened, the vacuum adjusting valve 7 remaining closed at locked control circuit. After 10 seconds waiting period and complete flushing, the vacuum control is released. The flushing valve 5 is closed, after a waiting period of about 10 seconds, the vacuum adjusting valve 7 is actuated for switching on the vacuum control or the vacuum pump 3, this is followed by a further waiting period of about 10 seconds and finally, on reaching a predetermined level of the material-air mixture, in particular the fibrous material suspension, in the storage container 9, the level control acting on the automatic control is conveniently released.

For interrupting the degassing and pumping operation initiated by an interruption criterium or command, the vacuum pump 3 is first switched off, the vacuum irrigation valve 6 and the vacuum adjusting valve 7 are closed, this is followed by a waiting period of about 10 seconds, then the flushing valve 5 is opened and the pump engine 1'" is switched off, this is again followed by a waiting period of about 10 seconds, then the flushing valve 5 is closed, the degassing engine 2'" is switched off and the cooling water valve 4 is closed.

As already mentioned above, the gravity tower 9 normally contains a filling level meter or a level probe 13, so that the rotating speed of the pump or the pulp flow can be controlled as a function of the pulp level in the gravity tower.

In the operation of the plant, alarm signals and optionally corresponding operational measures or the like are conveniently provided in the event that the pulp level in the gravity tower or collecting main or stand pipe or supply container 9 drops below a minimum value $H_{MIN}$ (see FIG. 1) or in the event that a maximum level $H_{MAX}$ (see FIG. 1) in the gravity tower or collecting main or stand pipe 9 is exceeded or if the rotating speed of the pump remains at 3,000 rpm for more than 60 seconds ($n_{max(t)}$).

The switching-off operation is initiated immediately on reaching an interruption criterium. Interruption criteria are the following: Exceeding a maximum level $H_{NOT}$ (see FIG. 1) of the pulp in the gravity tower or collecting main or stand pipe 9, failure of the degassing device 2, dropping of the rotating speed of the degassing device or of its driving engine 2'" to zero and exceeding a predetermiend maximum value of the power of this driving engine 2'".

It is intended, for instance, that the degassing device generate only a low pressure , for instance of about 0.2 bar measured in water, in the direction of the pulp pump intake, thus generate no actual or special or independent pumping effect. The driving output of the degassing device amounts to e.g. 20 to 30 percent of the output of the pulp pump 1. The functioning performance of the degassing device naturally depends on the sealing effect of the axial face seal in the pulp pump and in the degassing device, the sealing effect of slides and flange connections. Of further advantage is the possibility of dismantling the rotor without having to evacuate the gravity tower or collecting main or stand pipe 9.

The following should be noted in regard to the operation of the plant and the function of the aforementioned device and plant elements:

The coordination of the switching operations and the control of the pump and the degassing device is effected either by a freely programmable control or a computerized process control.

The degassing device mainly serves the following purpose:

At a consistency of the suspension to be pumped of up to about 10 percent atro (depending on the type of suspension), the degassing means mainly has the function of a feeding means to the pump, at consistencies of 10 to 15 percent atro, the suspension naturally contains larger amounts of air and the degassing device must function as a degassing means in addition to the feeding function. Pumping the suspension in this consistency range would be virtually impossible without degassing because the air separating in the center of the pump impeller due to centrifugal effect would quickly fill the intake of the pump so that the aspirating flow would be interrupted.

The gas, in particular air, sucked off according to the invention causes a beneficial secondary effect permitting a saving in chemicals possibly having to be added. Further, pulsations in the pressure line of the pump which might be caused by the compressed trapped gas are prevented.

In summarizing, the following is to be noted in regard to the function and control of the degassing device:

Due to the comparatively high rotating speed (n 3,000 l/min) and suitable shape of the degassing rotor 18, the gas, in particular air, is separated in the center of the rotor 18 (centrifuge). This separated gas must be sucked on by means of the vauum pump.

The main problem in aspiration consists in the recognition of the separated gas volume and the subsequent correct metering of the vacuum required for aspiration.

If the aspiration is too strong and constant, there is the hazard that the suction line and the accoutrements up to the vacuum pump 3 become clogged with sucked-on suspension within a short time.

In order to prevent this on starting, during operation and on stopping the degassing device 2, various switching and control operations are programmed.

A sure indication of the amount of gas separated consists in the measured input of the rotor driving engine 2'". A large amount of gas lowers the input, while a small amount of gas increases the input, caused by the full immersion of the rotor 18, in particular the rotor ribs 24 and reinforcing blades 22, in the suspension (p - difference suspension to gas 1000 : 1).

The starting point for setting the set value of the driving output of the rotor drive 2'" is the power input in operation with an air-free suspension or water.

This set value, which as a function of the consistency and type of suspension is to be set lower by 10 to 75 percent, in particlar by 20 to 40 percent, conveniently by about 30 percent, than the value measured with water or the driving output measured with water, is kept constant by means of a controller acting on the vacuum control valve 7.

This assures a certain safety distance of the suspension to the filter pipe 21. Since the gas-filled center cannot be free of pulp particles due to the high turbulences acting there, a filter pipe 21 and 21' was provided upstream from the suction line as a guard against the penetration of solid particles.

During standstill, the filter pipe 21 and 21' and the centrifugal valve 36 and 36', which does not upen until a rotation speed of about 2000 l/min is reached, protect the suction line against the penetration of the suspension.

In order to assure that no aspiration of the suspension into the filter pipe 21 and 21' takes places on starting and stopping of the pump 1 and the degasser 2, a programmed flushing operation via the flushing valve 5 is conveniently provided in the starting and stopping phase. The time sequence of these operations and the control circuits, the alarm signals, the starting and stopping criteria are to be preferably applied as indicated above. In each case, the starting sequence is to be set as a function of the using conditions of the pumps.

FIGS. 13 to 16 show various possibilities of the installation or connection of the degassing device 2 in or on the storage container 9. Depending on the requirements, such installations or connections can be effected in such a manner that the axis of the rotor 18 of the degassing device 2 extends vertically (FIGS. 13, 14), horizontally (FIGS. 15, 16) or variously inclined (FIG. 14). Feeding of the material-gas mixture into the housing 2''' or to the rotor 18 of the degassing device is accordingly effected from the top or from the side. The material outlet or discharge 19 is always provided on the periphery of the housing of the device 2, namely for instance via a valve 37. It may also be a case of the separate preparation of a material-gas mixture, in particular a fibrous material suspension, in the degassing device 2 prior to its charging into a pump.

The degassing device 2 can also be directly connected to an integrated pipe system. As shown in FIG. 17, the device 2 can be connected in any given position to the end of the pipe system 38 into which the mixture is fed via the pump 39, while it is discharged by means of pump 37. The degassing device 2 can have the embodiment described above or one similar thereto. In the following, possible modifications are explained with reference to FIGS. 18 and 19.

A further variant of the invention is described with reference to FIGS. 18 and 19. The degassing device 2 is provided with a housing 2'' and a rotor 18 supported therein. For the separate preparation of a fibrous material suspension prior to is charging into a pump 1, a single cage-like rotor 18 mainly serving as a high-speed agitating element is supported in a conveniently approximately cylincdrically shaped housing 2'' and an axially extending gas-tapping pipe, in particular air-tapping pipe 41, stationary in relation to the rotor 18 and provided with an orifice 40 on its upper end, is provided in the rotor center and joined on its lower end 42 or end facing away from the mixture feed to a stationary gas-tapping channel, in particular air-tapping channel 43 sealed against the rotating shaft of the rotor 18 and conveniently connected or connectable to a vacuum pump 3, the rotor length or height conveniently substantially exceeding the outer diameter of the rotor, so that on connecting the device 2 to a container 9 containing the material-gas mixture, in particular the fibrous material suspension, to be evacuated therefrom, said rotor partially projects into said container. The rotor 18 is conveniently provided with circular disks 44 extending approximately cross-axially to its axis of rotation or conveniently circle sectors 46 at least partially helically arranged and attached to ledges 45 preferably extending parallel to the axis. A preferred embodiment is characterized by circle sectors 46 with upended ledges 45 with approximately radially extending lateral longitudinal faces 47 attached thereon. The degassing effect can be enhanced by providing, as shown here, a conveniently three-armed blade star 49 of substantially smaller diameter than the outer diameter of the rotor in the center of the rotor 18 extending parallel to the axis approximately from the inner end 48 of the gas-tapping pipe, in particular air-tapping pipe, said blade-star 49 forming part of the rotor and thus being entrained in rotation by the rotor cage in operation. The connecting pieces 56 are welded onto the star 49 and screwed to the top segment 46 and thus serve for fastening the blade star 49. It may be convenient for the practical use of the invention to support the rotor 18 eccentrically in the in particular cylindrical housing 2''. It may be particularly advantageous for degassing to provide for the distance between rotor and housing to be large enough to permit the formation of an interface paraboloid open towards the top of the mixture (interface mixture—air) on rotation of the rotor 18 and optionally of the blade-star 49 as well as the formation of a good central gas column. For this purpose, the inner diameter of the rotor housing 2'' is substantially larger than the outer diameter of the rotor 18, the ratio for instance being that of 3 to 1 to 1.5 to 1, conveniently of about 2.5 to 1 to the outer diameter of the rotor.

A particularly convenient embodiment results if an in particular cylindrical space 53 is provided between the outer jacket of the gas-tapping pipe 41 and the shaft 50 of the rotor 18 which is formed hollow in this area and its bearings 51 and seals 52, 52', the space 53 directly or indirectly communicating with a cooling water supply 54 or the vacuum pump 3, so that the cooling water 54 which is required for cooling the seal 52' sealing the gas-tapping pipe, in particular air-tapping pipe against the rotor shaft in relation to which it is stationary, conveniently also serves for cooling and lubrication of the sliding bearing 55 guiding the gas-tapping pipe, in particular air-tapping pipe entrained in rotation by the shaft, and subsequently serves as cooling water for the air-tapping pipe 41, can be fed during operation and finally be sucked off by the vacuum pump 3.

A favorable operating procedure can be set up if the evacuation or aspiration of the gas, in particular the air, from the gas-tapping pipe, in particular the air-tapping pipe, 41, in particular from the center of the rotating motion of the material-gas mixture, is controlled as a function of the power input of the engine 2''' generating the rotation of the material-gas mixture in the housing 2'' containing the rotor 18 (also see FIG. 1). In this case, the set value for the power input can be set lower by 10 to 75 percent, in particular 20 to 40 percent, conveniently by about 30 percent, than that in operation with a suspension free of gas or air or water.

In summarizing, it should be noted in regard to the device last described that an axially extending gas-tapping pipe, in particular air-tapping pipe 41 provided with an orifice 40 in its upper end and stationary in relation to the rotor 18 is provided in the rotor center and joined on its lower end 42 to a gas-tapping channel, in particular air-tapping channel 43 sealed against the rotating shaft and stationary in relation to it (FIG. 1)

and conveniently connected or connectable to a vacuum pump 3. The water required for cooling the seal required for sealing the gas-tapping pipe, in particular air-tapping pipe against the rotor shaft is conveniently also used for cooling and lubricating the sliding bearing entrained in rotation by the shaft and guiding the gas-tapping pipe, in particular air-tapping pipe and subsequently as flushing water for the gas-tapping pipe, in particular air-tapping pipe, to be finally sucked off by the vacuum pump.

We claim:

1. A process for the treatment of material-gas mixtures to be pumped, the gas being separated prior to a separate pumping operation wherein material separated from the material-gas mixture is pumped through a pump housing, comprising the steps that preceding the pumping operation on the separated material, the material-gas mixture is subjected to a rotation produced by one single cage-like rotor for gas separation within a special container separated from the pump housing, while directly and only in the center of the rotating motion, separated gas is sucked from the material-gas mixture by vacuum means.

2. The process according to claim 1, wherein separated gas is sucked from the material-gas mixture by vacuum means having inlets arranged along an axis extending along the center of rotating motion.

3. The process according to claim 1, wherein the material-gas mixture is subjected to a rotation of between 1,200 and 3,400 rpm.

4. The process according to claim 1, wherein the material-gas mixture is subjected to a rotation of 3,000 rpm.

5. The process according to claim 1, wherein the material-gas mixture is fed to the special container from the top, the gas discharge is effected in the center on a side of a vacuum means connected to the special container and the discharge of the virtually degassed mixture from said special container to a pump in the pump housing separate from said special container is effected on an outer jacket of said special container.

6. The process according to claim 1, wherein the material-gas mixture is fed to the special container from the side.

7. The process according to claim 1, wherein the material-gas mixture is fed to the special container on the side of a vacuum means connection positioned on the underside of said special container.

8. The process according to claim 1, wherein the material-gas mixture is directly fed to the rotating mixture from a storage container.

9. The process according to claim 1, wherein the material-gas mixture is directly fed to the rotating mixture from a vertical storage container or gravity tower.

10. The process according to claim 1, wherein the material-gas mixture is directly fed to the rotating mixture from an integrated pipe system.

11. The process according to claim 1, wherein for starting the process for the treatment of material-gas mixtures, the special container and a stuffing box of the vacuum means are first flushed with water.

12. The process according to claim 1, wherein the evacuation or aspiration of the gas from the center of the rotating motion of the material-gas mixtures in the special container is controlled as a function of the power input of the engine generating the rotation of the material-gas mixture contained in the separate container.

13. The process according to claim 12, further comprising setting a value for the power input of the engine generating the rotation of the material-gas mixture to a value ower by 10 to 75 percent than the required to rotate the rotor in a suspension free of gas or to rotate the rotor in water.

14. The process according to claim 13, wherein said set value is lowered by 20 to 40 percent.

15. The process according to claim 13, wherein said set value is lowered by about 30 percent.

16. The process according to claim 11, further comprising the steps of first opening a flushing valve, then starting a pump engine so as to reach a predetermined speed of revolution, then starting an engine for the degassing device, then opening a valve for a cooling water supply, then turning on the vacuum means and opening a vacuum irrigation valve, and then, after said rotor has achieved a predetermined speed, driving a vacuum adjusting valve into open position.

17. The process according to claim 11, wherein a vacuum control is released subsequent to the flushing operation.

18. The process according to claim 17, comprising the steps of first closing a flushing valve, whereupon a vacuum adjusting valve is actuated for switching on the vacuum control or vacuum means and finally a level control is released on reaching a predetermined level of the material-gas mixture in a storage container.

19. The process according to claim 1, further comprising steps for switching off the degassing and pumping operation which steps include switching of said vacuum means, then closing a vacuum irrigation valve and a vacuum adjusting valve, then opening a flushing valve, and then shutting off a pump driving engine, then closing a flushing valve, and finally a degassing engine is switched off and a cooling water valve is closed.

20. A plant for the treatment of material-gas mixtures, comprising:
   a pump;
   a first housing containing said pump;
   a degassing device which includes a second housing, a rotor positioned within said second housing and having a hollow center region, and a gas-tapping pipe having orifices formed therein, said gas-tapping pipe extending into the hollow center of said rotor and said second housing including a material-gas inlet and a material discharge opening;
   vacuum means in communication with said gas-tapping pipe;
   a material discharge conduit extending between said material discharge opening and said pump housing and providing a passageway for the passage of material separated out of said material-gas mixture from said second housing to said separate first housing.

21. The plant according to claim 20, further comprising a first driving engine for driving said pump and a second driving engine for driving said rotor.

22. The plant according to claim 20, wherein said vacuum means is a vacuum pump.

23. The plant according to claim 20, wherein said vacuum means is a vacuum pump.

24. The plant according to claim 20, wherein said vacuum means is connected on a side of said degassing housing facing away from the mixture feed.

25. The plant according to claim 20, wherein said second housing of said degassing device has a special container and said vacuum means is connected on the bottom of said special container, and said rotor of said degassing device having approximately a vertical axis of rotation.

26. The plant according to claim 20, further comprising a storage container for the material-gas mixture, said storage container being directly attached to said second housing.

27. The plant according to claim 26, wherein said second housing and said rotor are vertically orientated, and said storage container for the material-gas mixture is directly attached on a top side of said second housing.

28. The plant according to claim 26, wherein said rotor and second housing are obliquely or horizontally arranged with respect to said storage container for the material-gas mixture, and said storage container being directly attached on a side of the degassing device which faces away from said vacuum means.

29. The plant according to claim 20, further comprising flushing means which is in fluid communication with said degassing device and said vacuum means.

30. The plant according to claim 20, further comprising fluid cooling means connected to said degassing device and said vacuum means.

31. The plant according to claim 20, wherein said rotor is in the form of a cage-like rotor, said gas-tapping pipe extends along the central axis of said cage-like rotor, and said orifices are arranged along the length of said gas-tapping pipe.

32. The plant according to claim 30, further comprising:
a first driving means for driving said rotor;
a second driving means for driving said vacuum means;
a third driving means for driving said pump;
automatic control means in electrical communication with said first, second and third driving means for varying the output of said first, second and third driving means in response to variations in the ratio off material to gas in said material-gas mixture.

33. The plant according to claim 32, further comprising a storage container attached to said second housing and monitoring means for monitoring the filling level of said storage container, and said monitoring means being in electrical communication with said automatic control means.

34. The plant according to claim 20, wherein said rotor of the degassing device is a single cage type high-speed agitating element, the axis of said one single rotor extending approximately vertically into said second housing which is approximately cylindrical, said one single cage-like rotor being supported in said approximately cylindrical housing, said gas-tapping pipe axially extending along the central axis of said cage-like rotor and said vacuum means including a vacuum pump and a channel extending from said vacuum means to said gas-tapping pipe and connection means for connecting said channel to an end of said gas-tapping pipe positioned on the control axis of said rotor.

35. The plant according to claim 20, further comprising a storage container having an outlet opening into the inlet of said second housing, and wherein the length or height of said rotor exceeds the length or height of said second housing such that said rotor projects through the inlet opening in said second opening and into said storage container.

36. The plant according to claim 20, wherein said gas-tapping pipe is entrained in rotation by said rotor.

37. The plant according to claim 20, wherein said rotor is a single cage-like rotor having cross-axially extending circular disks and ledges extending parallel to the central axis of said rotor, and said ledges being attached to the periphery of the disks.

38. The plant according to claim 37, wherein said disks are of star-like shape on their peripheries.

39. The plant according to claim 37, wherein said ledges are fixed sunkenly on the periphery of said disks.

40. The plant according to claim 37, wherein said one single cage-like rotor further comprises three-armed stars and upended ledges with approximately radially directed lateral longitudinal faces attached thereon.

41. The plant according to claim 40, wherein said star-like disks are propeller-like in shape.

42. The plant according to claim 41, wherein said stars are arranged directly below the inlet formed in said second housing.

43. The plant according to claim 20, wherein said second housing is cylindrically formed and said one single cage-like rotor is eccentrically supported in said housing.

44. The plant according to claim 20, wherein said gas-tapping pipe includes a supporting pipe provided with orifices disposed therein, a perforated pipe or sieve-pipe drawn over and surrounding the supporting pipe and of a retaining pipe provided with orifices in the area of the supporting pipe orifices surrounding the perforated pipe.

45. The plant according to claim 44, wherein said gas-tapping pipe is closed at the end farthest from the connection to said vacuum means.

46. The plant according to claim 20, wherein said vacuum means includes a vacuum pump and channel extending between said vacuum pump and said gas-tapping pipe, and said rotor is connected to a centrifugal governor which regulates flow between said vacuum means and said gas-tapping pipe.

47. The plant according to claim 20, wherein said vacuum means includes a vacuum pump and a channel extending between said vacuum pump and said gas-tapping pipe, and said rotor is connected to a centrifugal valve which regulates flow between said vacuum means and said gas-tapping pipe in according with the rotation speed of said rotor such that flow between said gas-tapping pipe and said vacuum means occurs only when a predetermined rotor speed is reached.

48. The plant according to claim 47, wherein said rotor is connected to a solenoid and said solenoid includes means to block or open fluid flow between said vacuum means and said gas-tapping pipe in accordance with rotor speed.

49. The plant according to claim 32, further comprising a storage container attached to said second housing, means for metering the consistency of said material-gas mixture in said second housing, and adjusting means for adjusting the amount of material-gas mixture received in said second housing from said storage container, and said automatic control device preprogrammed by a computer program and, in addition, said first, second and third driving means are in communication with said consistency metering means and to said adjusting means such that said first, second and third driving means are regulated as a function of the mixture consistency and a predetermined delivery volume and delivery height of said material-gas mixture.

50. An apparatus for the separation of gas from material-gas mixtures, comprising a housing, said housing being approximately cylindrically formed, and one single rotor supported therein, said housing having a material-gas mixture inlet formed therein, and a material discharge provided on the housing periphery, said one single rotor being formed cage-like, said rotor having a hollow center formed therein, and a gas-tapping pipe provided with orifices, said gas-tapping pipe disposed in the hollow center of said rotor and extending along the axis of rotation of this rotor, a gas-tapping channel joined to an axially extending interior space of said pipe at one end and a vacuum pump at an opposite end, said one single cage-like rotor being supported in said housing and serving mainly as a high-speed agitating element, said housing being of an inner diameter which is 1.5:1 to 3:1 times larger than the outer diameter of said rotor, and the gas-tapping channel being in communication with the interior of said gas-tapping pipe and joined directly to an end of said gas-tapping pipe positioned furthest from said material-gas mixture inlet formed in said housing.

51. The apparatus according to claim 50, wherein said gas-tapping channel coincides with the axis of rotation of said one single rotor.

52. The apparatus according to claim 50, wherein said gas-tapping pipe is entrained in rotation by said rotor.

53. The apparatus according to claim 50, wherein said cage-like rotor comprises a single cage of cross-axially extending disks as well as ledges extending parallel to the central axis of said rotor and attached to the periphery of said disks.

54. The apparatus according to claim 53, wherein said cage has star-like disks.

55. The apparatus according to claim 54, wherein said ledges are sunkenly attached on the arms of the stars.

56. The apparatus according to claim 53, wherein said stars have three arms with upended ledges having approximately radially directed lateral longitudinal faces attached thereon, and the width of the faces measured in radial direction being substantially smaller than the length of the outer diameter of the rotor.

57. An apparatus for the separation of gas from material-gas mixtures comprising a housing, said housing being approximately cylindrically formed and having a material-gas inlet formed therein and a material discharge outlet formed therein;
- a rotor supported in said housing, said rotor being formed cage-like, and said rotor having a hollow center formed therein;
- an axially extending gas-tapping pipe provided with orifices disposed approximately in the hollow center of said rotor and extending in the axis of rotation of said rotor;
- a vacuum pump;
- a gas-tapping channel joined to an axially extending interior space of said gas-tapping pipe and in fluid communication with said vacuum pump;
- a vacuum control valve positioned in line between said gas-tapping pipe and said vacuum pump;
- driving means for rotating said rotor, said driving means including a current meter;
- a preprogrammed automatic control device connected to said current meter of said rotor driving means and to said vacuum control valve, said automatic control device having means for controlling, as a function of power input to the engine generating the rotation of the material-gas mixture in the housing containing the rotor, the evacuation or aspiration of the gas through the gas-tapping pipe from the center of rotation of the material-gas mixture.

58. The apparatus according to claim 57, wherein said automatic control device includes programming means for programming to a set value the power input of generating the rotation of the material-gas mixture with the set value being lower by 10 to 75 percent than the power input required for rotation operation with a suspension free of gas or air or rotor operation with water.

59. The apparatus according to claim 58, wherein said programming means includes means for setting the power input of the rotor driving means at a value which is lower by 20 to 40 percent than the power input required for rotor operation with a suspension free of gas or air or rotor operation with water.

60. The apparatus according to claim 58, wherein said programming means includes means for setting the power input to said rotor driving means at a value which is lower by about 30 percent than the power input required for rotor operation with a suspension free of gas or air or rotor operation with water.

61. An apparatus for the separation of gas from material-gas mixtures, comprising:
- a housing, said housing being approximately cylindrical in shape and having a material-gas mixture inlet and a material outlet formed therein;
- a rotor supported in said housing so as to provide a high-speed agitating element in said housing, said rotor including a cage-like structure having an axially extending hollow center, said rotor further including a shaft member;
- rotor driving means for rotating the shaft member of said rotor, a gas-tapping pipe having an orifice at an end situated in the hollow center of said cage-like structure, and said gas-tapping pipe extending axially along the hollow center of said cage-like structure, said gas-tapping pipe being stationary in relation to said rotor when said rotor is being driven by said rotor driving means;
- a gas-tapping channel connected to the opposite end of said gas-tapping pipe, said gas-tapping channel being sealed against and stationary in relation to said rotating shaft and in fluid communication with said vacuum pump.

62. The apparatus according to claim 61, further comprising a material-gas storage container and wherein the length of said one single cage-like rotor exceeds the outer diameter of the rotor, so that said rotor partially projects into said storage container.

63. The apparatus according to claim 61, wherein said cage-like structure is provided with circular disks extending approximately cross-axially to its axis of rotation.

64. The apparatus according to claim 61, wherein said cage-like structure is provided with at least partially helically arranged circle sectors attached to ledges extending parallel to the axis of said rotor.

65. The apparatus according to claim 64, wherein circle sectors have approximately radially directed lateral longitudinal faces.

66. The apparatus according to claim 64, wherein said rotor further comprises three-armed blade stars of substantially smaller diameter than the outer diameter of the rotor, said blade stars being serially arranged along the axis of said rotor with a first in the series being at a level essentially equal with the level of the orifice formed in said gas-tapping pipe with the remainder of said blade stars being placed closer to said material-gas inlet.

67. The apparatus according to claim 61, wherein said rotor is eccentrically supported in the housing of the degassing device.

68. The apparatus according to claim 61, wherein the ratio of the inner diameter of the rotor housing to the outer diameter of the rotor is one of 3 to 1 to 1.5 to 1.

69. The apparatus according to claim 68, wherein the ratio of the inner diameter of the rotor housing to the outer diameter of the rotor is one of 2.5 to 1.

70. The apparatus according to claim 61, further comprising a cooling water source and a space provided between an outer jacket of the gas-tapping pipe and said shaft member, said space being sealed at its ends by a bearing member and a sealing member forming part of said apparatus such that cooling water from said cooling source cools the bearing and sealing members, said cooling source also providing a source flushing water for the air-tapping pipe.

71. A process for the treatment of an air-containing fibrous material suspension comprising:
rotating the suspension with a cage-like rotor having a hollow center and positioned within a rotor housing being approximately cylindrically formed such that the fibrous material becomes separated from the air;
sucking off the separated air directly from the hollow center of said cage-like rotor with vacuum means;
drawing the previously separated fibrous material from said rotor housing to a separate pump housing containing a pump.

72. The process according to claim 71, wherein said cage-like rotor extends for the full height of said rotor housing such that during the sucking off of air an unoccupied column of air is created for the full height of the rotor housing whereby the sucking off step draws air from the entire unoccupied column.

73. The process according to claim 71, wherein the air-containing fibrous material suspension is subjected to a rotation of between 1,200 and 3,400 rpm.

74. The process according to claim 71, wherein the air-containing fibrous material suspension is subjected to a rotation of between 3,000 rpm.

75. The process according to claim 71, further comprising feeding the air-containing fibrous material suspension into an opening provided in the top of said rotor housing and discharging the air through a gas-tapping pipe in communication with vacuum means and discharging the virtually degassed mixture to the pump through a discharge opening formed in said rotor housing and then through a conduit leading to said pump housing.

76. The process according to claim 71, wherein the air-containing fibrous material suspension is fed to said rotor housing through an inlet opening formed in one side of said rotor housing.

77. The process according to claim 71, wherein the air-containing fibrous material suspension is fed through an inlet opening formed in said rotor housing on the same side of the vacuum means connection on the underside of said rotor housing.

78. The process according to claim 71, wherein the air-containing fibrous material suspension is fed first into a storage container prior to being fed into said rotor housing.

79. The process according to claim 71, wherein the air-containing fibrous material first fed into a vertically arranged storage container or gravity tower and than into said rotor housing.

80. The process according to claim 71, wherein the air-containing fibrous material suspension is directly fed into the rotor housing from an integrated pipe system.

81. An apparatus for the separation of air from air-containing fibrous material suspensions, comprising an approximately cylindrically formed housing and one single rotor supported therein, a material-air mixture feed into the housing and a material discharge provided on the housing periphery, said one single rotor being formed cage-like, said rotor having a hollow center, an air-tapping pipe provided with orifices disposed in the hollow center of the rotor and in the axis of rotation of said rotor, an air-tapping channel joined to said pipe and connectable to a vacuum pump, said rotor serving as a high-speed agitating element being supported in said housing, said housing being of an inner diameter which is about 1.5:1 to 3:1 times larger than the outer diameter of the rotor and the air-tapping channel joining the interior space of the air-tapping pipe directly at an end facing away from the mixture feed.

82. The apparatus according to claim 81, wherein said air-tapping channel coincides with the axis of rotation of said rotor.

83. The apparatus according to claim 81, wherein said air-tapping pipe is entrained in rotation by said rotor.

84. The apparatus according to claim 81, wherein said cage-like rotor comprises a single cage of cross-axially extending star-like disks as well as ledges extending parallel to the axis and sunkenly attached to the arms of the stars.

85. An apparatus for the separation of air from air-containing fibrous material suspensions, comprising:
a housing, said being approximately cylindrical formed and one single rotor supported therein;
a material-air mixture feed formed in said housing and a material discharge provided on the housing periphery, said one single rotor being formed cage-like, and said rotor having a hollow center;
an axially extending air-tapping pipe provided with orifices disposed in the hollow center of said rotor and extending along the axis of rotation of said rotor;
an air-tapping channel joined to an axially extending interior space of said gas-tapping pipe and connectable to a vacuum pump;
a rotor driving engine with current meter;
a vacuum control valve; and
a preprogrammed automatic control device connected to the current meter of the rotor driving engine and to a vacuum control valve, and said automatic control device having means for controlling the evacuation or aspiration of the air from the air-tapping pipe from the center of the rotating motion of the material-air mixture as a function of the power input of the engine generating the rotation of the material-air mixture in the housing containing the rotor.

86. An apparatus for the separation of air from air-containing fibrous material suspension, having a housing, said housing being approximately cylindrical formed, a single rotor being supported therein, said rotor being formed of a cage-like structure such that said rotor serves as a high-speed agitating element, said rotor further comprising a shaft member adapted for rotation by a rotor driving means, suspension feed, an axially extending air-tapping pipe having an orifice formed at an end nearest the suspension feed, said air-tapping pipe being stationary and extending into the rotor along the central axis of said rotor, an air-tapping channel sealed against and stationary in relation to the rotating shaft of the rotor and joined to the end facing away from the suspension feed of the pipe, and said air-tapping channel being connected to a vacuum pump.

87. The apparatus according to claim 86, further comprising a storage container for the air-containing fibrous material suspension, and wherein the length or height of said one single cage-like rotor substantially exceeds the outer diameter of the rotor such that, on connecting said storage container to said housing, said rotor partially projects into said container.

88. The apparatus according to claim 86, wherein the ratio of the inner diameter of the rotor housing to the outer diameter of the rotor is one of 3 to 1 to 1.5 to 1.

89. The apparatus according to claim 86, wherein the ratio of the inner diameter of the rotor housing to the outer diameter of the rotor is one of 2.5 to 1.

90. The apparatus according to claim 86, further comprising a cooling and flushing water source and a conduit extending between said cooling water source and said vacuum pump and between said cooling water source and a cooling water space formed between said gas-tapping pipe and said shaft member.

91. A process for the treatment of medium and highly consistent material-gas mixtures to be pumped, the gas being separated prior to a separated material pumping operation, comprising the steps that preceding the separated material pumping operation, the material-gas mixture is subjected, for gas separation purposes, to a rotation produced by one single cage-like rotor in a special container being approximately cylindrically formed and separated from a housing containing a pump used in the pumping operation, while directly and only in the center of the rotating motion, gas is sucked from the material-gas mixture by a vacuum means.

92. A process according to claim 91, wherein the material-gas mixture is subjected to a rotation of between 1,200 and 3,400 rpm.

93. The process according to claim 91, wherein the material-gas mixture is subjected to a rotation of between 3,000 rpm.

94. The process according to claim 91, wherein the gas-material mixture is fed to the special container from the top, the gas discharge being effected on the side of connection of a vacuum means connector which is in the center of the special container, and the discharge of the virtually degassed mixture to the pump positioned separate from said special container being effected on the outer jacket of said special container.

95. The process according to claim 91, wherein the material-gas mixture is fed to the special container from a side of the special container.

96. The process according to claim 91, wherein the material-gas mixture is fed to the special container on an underside of said special container which is where the connector is located for the vacuum means.

97. The process according to claim 91, wherein the material-gas mixture is directly fed to the rotor from a storage container attached to a side of the special container.

98. The process according to claim 91, whrein the material-gas mixture is directly fed to the rotor from a vertical storage container or gravity tower attached to said special container.

99. The process according to claim 91, wherein the material-gas mixture is directly fed to the rotor from an integrated pipe system.

100. An apparatus for the separation of medium and highly consistent material-gas mixtures, comprising:
an approximately cylindrically formed housing;
a single rotor having a cage-like structure and said rotor supported in said housing;
a vacuum pump;
said housing having material-gas mixture feed inlet formed therein and a material discharge outlet formed therein, said one single rotor having a cage-like structure, and said rotor having a hollow center;
an axially extending gas-tapping pipe provided with orifices disposed in the hollow center of the rotor extending in the axis of rotation of said rotor;
a gas-tapping channel joined to an axially extending interior space of said gas-tapping pipe and connectable to said vacuum pump;
a rotor driving engine with current meter;
a vacuum control valve positioned in line between said vacuum pump and said gas-tapping pipe;
a preprogrammed automatic control device connected to the current meter of said rotor driving engine and to said vacuum control valve, whereby the evacuation or aspiration of the gas from the gas-tapping pipe from the center of the rotating motion of the material-gas mixture is controlled as a function of the power input of the engine generating the rotation of the material-gas mixture in the housing containing the rotor.

101. An apparatus for the separation of medium and highly consistent material-gas mixtures having a housing, said housing being approximately cylindrically formed, and one single rotor supported therein, said rotor being of cage-like construction and having a rotatable shaft member, said rotor mainly serving as a high-speed agitating element and being supported in said approximately cylindrically formed housing, a mixture feed inlet formed in said housing, an axially extending gas-tapping pipe having an orifice on an end situated nearest the mixture feed and being stationary in relation to the rotor, said gas-tapping pipe extending along the center of rotation of said cage-like rotor, a gas-tapping channel and sealed bearings sealing said gas-tapping channel against said rotatable shaft member and positioned in stationary relationship with said shaft member, said gas-tapping channel extending from an end of said gas-tapping pipe which is furthest from said mixture feed, and a vacuum pump in fluid communication with said gas-tapping channel.

102. The apparatus according to claim 101, further comprising a storage container attached to said housing wherein the length or height of said cage-like rotor substantially exceeds the outer diameter of the rotor, so that on connecting said housing to said container containing the material-gas mixture to be evacuated, said rotor partially projects into said container.

103. The rotor according to claim 101, wherein the ratio of the inner diameter of the rotor housing to the outer diameter of the rotor is one of 3 to 1 to 1.5 to 1.

104. The apparatus according to claim 101, wherein the ratio of the inner diameter of the rotor housing to the outer diameter of the rotor is one of 2.5 to 1.

105. The apparatus according to claim 101, wherein a cooling water space is formed between said shaft member and said gas-tapping pipe, said cooling water space in fluid communication with a cooling water source and with said vacuum pump, said apparatus further comprising sealing means sealing ends of said space, so that the cooling water introduced into said space for cooling the sealed bearings.

106. A process for the treatment of material-gas mixtures to be pumped, comprising:
introducing a material-gas mixture into a first housing;
subjecting the material-gas mixture introduced into said first housing to rotation through use of a cage-line rotor having a hollow center and positioned within said first housing such that, while within the first housing, the gas is separated from the mixture;
sucking off gas that has accumulated within the hollow center of rotation of said cage-like rotor with vacuum means having a hollow inlet positioned with the centered formed in said cage-like rotor;
forwarding the material separated from the material-gas mixture from said first housing and into a second housing containing a pump.

* * * * *